2,973,309

STABLE BUTYL LATICES

Robert S. Brodkey, Roselle, and John Rehner, Jr., Westfield, N.J., assignors to Esso Research and Engineering Company, a corporation of Delaware No Drawing. Filed Aug. 14, 1956, Ser. No. 603,858

6 Claims. (Cl. 204—154)

This invention relates to the preparation of stable butyl rubber latices through the use of high intensity ionizing radiation. It is more particularly directed to the treatment of butyl latices by reaction with certain polymerizable monomers under the influence of radiation comprising neutrons and/or gamma rays.

In brief compass, this invention proposes a process for stabilizing a butyl latex. This process comprises admixing the butyl latex with a ploymerizable monomer selected from the group consisting of vinyl acetate, acrylonitrile, and mixtures thereof, exposing the admixture to a limited amount of high intensity ionizing radiation, preferably 3.5 to 4.0 megaroentgens, in a reaction zone, and recovering a stable latex.

It has previously been known to prepare butyl latices by various methods. Such latices, however, have generally been unstable and otherwise unsatisfactory under the conditions of storage and handling accompanying their use. The latices tend to coagulate when subjected to mechanical stress and/or temperature changes.

It has now been found that excellent stability can be imparted to a butyl latex by reacting the latex with certain select monomers under the influence of high intensity ionizing radiation. Besides stability, the latex has other properties imparted to it that make the latex product more valuable.

As known in the art, butyl latices are useful as adhesives and in the treatment of fabrics, manufacture of dipped goods, and other uses where natural or GR–S latex can be used. They are especially useful in dipping tire cords prior to the incorporation of the cords into a tire carcass.

This invention is specifically directed to the treatment of butyl latices. As known in the art, butyl rubber forming a butyl latex is characterized by relatively low unsaturation. In this respect, it is surprising that polymerizable monomers can be made to satisfactorily react with butyl rubber.

The butyl rubber used to form the latex is a copolymer of isobutylene with a multiolefin prepared at low temperature by a Friedel-Crafts catalyst. The major component of the copolymer is preferably isobutylene. The minor component is a multiolefin having from 4 to 12 or 14 carbon atoms per molecule. The preferred multiolefins are butadiene, isoprene, dimethyl butadiene, dimethallyl, myrcene, allo-ocymene and the like. Of these materials, isoprene is presently regarded as the best multiolefin. The isobutylene and the multiolefins are mixed in the ratio of a major proportion of isobutylene and a minor proportion of the isoprene, the preferred range with isoprene being from 1 to 10 parts of isoprene with 99 to 90 parts of isobutylene.

The mixture of monomers is cooled to a temperature within the range between −40° C. and −164° C. The cold mixture is polymerized by the addition thereto of a Friedel-Crafts catalyst, preferably in the liquid or dissolved form. The polymerization proceeds rapidly to yield the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol or other material to inactivate the catalyst. The warm water flashes off the excess refrigerant, unpolymerized olefins and catalyst solvent. The polymer is recovered by straining or filtering or by other means and then may be dried.

A latex can be prepared from this butyl rubber in any convenient method. For example, in the solution technique, the rubber is dissolved in a suitable solvent such as hexane, heptane, octane, isooctane, the nonanes, the decanes, naphtha fractions, benzene, toluene, Varsol, Solvesso 100 (a substantially 100% aromatic hydrocarbon fraction boiling 315°–350° F.), and Solvesso 150 (a substantially 100% aromatic hydrocarbon fraction boiling 365°–415° F.), cyclohexane, and cyclohexene, carbon tetrachloride, trichloroethylene, carbon disulfide, methyl ethyl ketone and the like. The butyl rubber solution is then emulsified in water using an emulsifying agent such as potassium oleate, polyvinyl alcohol, polyoxyethylated alkyl phenols and mixtures thereof. The solvent is then stripped from the mixture to form an aqueous latex. The latex can then be concentrated by creaming, centrifuging or further heat stripping, if desired.

The butyl latices used in this invention are identified by the following specific characteristics. The butyl rubber in the latex has a molecular weight (Staudinger) in the range of 35,000 to 2,000,000 and a Wijs iodine number in the range of 0.5 to 50, preferably 7 to 15, which indicates that it has relatively low unsaturation. In the preferred embodiment, the isoprene content of the rubber is in the range of 0.5 to 15 wt. percent, with 1 to 2 wt. percent being preferred, the remainder of the composition being isobutylene.

The latex itself contains from 20 to 60 wt. percent solids. These solids preferably have a size under 10 microns.

During the preparation of butyl latices, it is conventional to add certain additives to improve properties, such as emulsifying agents. The preferred emulsifying agents incorporated into the butyl latex feed stock of this invention are potassium oleate, polyvinyl alcohol, polyoxyethylated alkyl phenols and mixtures thereof. These additives are used normally in an amount in the range of 1 to 10 wt. percent. Other types of emulsifiers can be used such as: alkyl sulfates, alkyl phenol polyoxyethylated sulfates, or alkyl polyoxyethylated sulfates used with or without inorganic salts such as $NaH_2PO_4$.

As previously indicated, only certain select polymerizable monomers are useful for the purposes of this invention. The monomers used are vinyl acetate, acrylonitrile, and mixtures thereof. Other monomers, apparently similar in properties, have been found not to give satisfactory results. It is not so much that the other monomers will not react with the butyl rubber, but it is that the reaction product does not form a satisfactory butyl latex. The above-identified monomers are used in amounts in the range of 3 to 10 wt. percent based on butyl rubber in the latex.

The irradiation of the latex-monomer mixture is carried out at relatively low temperatures. Normally the temperatures used are below 100° F., and preferably the temperature is in the range of 50 to 80° F. Liquid phase conditions are maintained and, therefore, the pressure is sufficient to maintain substantially liquid phase conditions and can range from 0 to 25 p.s.i.g. or higher. The time of treatment, which is dependent on rate of radiation dosage, may range from 1 to 50 hours.

The irradiation in the present invention is characterized as being relatively mild as compared to other types of radiochemical processes. The admixture must be given sufficient dosage to obtain a satisfactory reaction, but the dosage cannot be too extensive because the Butyl rubber will degrade. The amount of radiation given the admixture must be balanced against the desired adhesion and stability characteristics of the final latex. The total radiation dosage received by the mixture will normally be above about 0.75 megaroentgen but under 50 megaroentgens. It is preferably in the range of 3.5 to 4.0 megaroentgens to achieve the most desirable balance between stability and adhesion, as later demonstrated.

The radiation can be obtained from charged particle accelerators such as Van de Graaf generators, from waste materials from a nuclear reactor such as spent fuel elements or portions thereof, or from material especially made radioactive such as cobalt 60. It is much preferred to using a radioisotope. The radiation in this preferred form of the invention consists essentially of gamma rays, although some alpha and beta radiation can be associated with it. When irradiating in the absence of neutrons, it is preferred that the average radiation intensity in the reaction zone be above 50,000 roentgens per hour (r./hr.).

The radiation can also be obtained from nuclear reactors such as atomic piles. In this form of the invention, wherein neutrons are used, it is preferred that the neutron flux in the reaction zone be above $10^8$ neutrons/cm.$^2$/sec. besides maintaining an appreciable gamma ray flux. Conventional moderators can, of course, be used such as water, carbon and hydrocarbons. In some cases the feed stream itself can serve as a moderator. If desired, the nuclear reactor can be shielded such that the reaction zone receives essentially gamma rays at a rate above 50,000 r./hr.

The reactant admixture is exposed to the radiation in any convenient manner. It can be done in a batchwise manner by placing the admixture in a suitable container near the radiation source. Alternatively, the fluid admixture can be flowed in suitable pipes or conduits in, around, or near the radiation source.

The irradiated product is useful in the form as recovered from the reaction zone. It can, however, be further treated if desired, as by vacuum distillation to concentrate it, filtration to remove any foreign materials, etc.

EXAMPLE I

Sixteen samples of butyl latices, with or without addition of monomers, were exposed to gamma radiation from an artificially produced cobalt 60 source in the form of a hollow two-inch pipe having a rating of about 3,000 curies.

The rubber and latex had the following inspections:

Rubber _____ 1.5 to 1.7 mole percent unsaturation; 440,000 Staudinger mol. wt.
Latex _____ 26% by wt. total solid.

The latex contained as emulsifiers:

3.4 p.h.r. (parts per hundred rubber) oleic acid
0.7 p.h.r. potassium hydroxide
3.1 p.h.r. polyoxyethylated alkyl phenol (Triton X–100)
2.7 p.h.r. partially hydrolysed polyvinyl alcohol To this latex was added 5 wt. percent of the monomer specified in the following table. In all cases, complete solubility of the monomer appeared to be obtained.

About 90 grams of each mixture were exposed in a 4 oz. narrow mouth clear bottle to the irradiation. The container was placed near the source so that the radiation intensity was about 520,000 r.h.r. and maintained there for 17.2 hours until total dosage of about $7.2 \times 10^6$ roentgens had been absorbed. The pressure was substantially atmospheric and the temperature was room temperature, 78° F.

The stabilities of the irradiated products were tested by (1) immediate visual inspection; (2) visual inspection after three months; (3) mechanical stability, and (4) freeze stability.

The mechanical stability test comprised taking 100 grams of the product latex containing 10% solids (arrived at by dilution of the 26% product with distilled water), and mixing it for three minutes at high speed in a Hamilton Beach No. 33 mixer. Following the 3-minute agitation period, each sample was allowed to stand for 5 minutes at room temperature before it was filtered through a 46 mesh screen. The screen was then dried by a suitable means, for example, under an infrared lamp, and weighed. The coagulant formed during the stirring operation was expressed in terms of weight percent. A low number is desired. 100% is complete coagulation of the rubber.

The freeze stabilities were determined by alternately solidifying the mixture at a temperature below 15° F. for 8 hours and bringing it to room temperature, 78° F., during the next 16 hours. The cycle was repeated three (3) times. The results reported for the first cycle are qualitative—simply noting whether the sample did or did not pass the test. After three cycles a "no" means the sample did not pass the test and was 100% coagulated. Where numbers are given, they are the percent coagulated. The mechanical and freeze stabilities were made at the same time as the three month visual observation.

A report of clear and very little flocculation in the visual observation is satisfactory. A value of over 3% for the mechanical stability test is unsatisfactory. A report of "yes" (passes test on first cycle) or under 30% coagulation on the third cycle for the freeze stability test is satisfactory.

The following table presents the results of these tests.

*Table I*

| Monomer | Mechanical Stability | Freeze Stability | | Immediate Visual Observation | Three-month Observation |
|---|---|---|---|---|---|
| | | 1 Cycle | 3 Cycles | | |
| Not irradiated—No monomer present. | 2.3 | no | no | clear | clear. |
| Irradiated—no monomer present. | 2.2 | no | no | floc | cream. |
| NaH$_2$PO$_4$ | 1.2 | no | no | little floc | brown cream. |
| Styrene | | gel | gel | do | partly coag., cream. |
| Methyl acrylate | | | | do | |
| Di-n-butyl itaconate | 2.5 | no | no | do | viscous clear. |
| Butyl soybate | high | no | no | floc | clear. |
| | 4.4 | no | no | do | cream. |
| Ethylene glycol dimethyl acrylate. | | | | gel | gel. |
| Allyl Acetate | 8.4 | no | no | very little floc | clear. |
| Methyl methacrylate | | | | gel | gel. |
| Vinyl oxo decyl ether | 5.2 | no | no | do | clear. |
| Allyl phthalate | 100 | no | no | very little floc | Do. |
| Cyclopentadiene | 0.5 | no | no | clear | Do. |
| Iso-propenyl acetate | 32.5 | yes | no | very little floc | Do. |
| Vinyl acetate | 0.2 | yes | 29% coag | do | clear, odor. |
| Acrylonitrile | 0.0 | yes | 4.3% Coag | do | clear. |

These data show that only certain of the many monomers tested gave satisfactory results. So far as the data now show, there appears to be no consistent reason why this is so. The monomers that give satisfactory results as shown by the table are acrylonitrile and vinyl acetate for both mechanical and freeze-thaw stability. Cyclopentadiene and iso-propenyl acetate gave promising results, but do not, so far, appear to be satisfactory.

EXAMPLE 2

The same butyl latex described in Example 1 was further tested with the two monomers, acrylonitrile and vinyl acetate. The conditions were the same except that the samples were irradiated at different rates and different total amounts of irradiation. The total irradiation time was 41.1 hours.

The irradiated mixtures were then tested for adhesion qualities. A rayon tire cord was dipped in the latex and dried in air at 250° F. for five minutes. The dipped and dried cord was cured in a butyl carcass composition, compounded as follows:

| | Parts |
|---|---|
| Butyl rubber | 100 |
| Carbon black | 50 |
| Extender oil | 15 |
| Zinc stearate | 0.5 |
| Zinc oxide | 5.0 |
| Sulfur | 2.0 |
| Tellurium diethyl dithiocarbamate | 1.0 |

The curing was carried out in a mold that provided an "H" test sample piece. The "H" test is that described by Lyons et al., Rubber Chem. Tech. 20: 268 (1947), using mold cavity dimensions of 0.380 inch wide, 0.180 inch deep. The adhesions were measured at 75° F., pulled at the rate of 10 inches per minute.

Table II

| Latex plus | Roentgens per Hour | Roentgens | Adhesion, pounds "H" test |
|---|---|---|---|
| 5% Acrylonitrile | 0 | 0 | 16.2 |
| Do | 56,000 | 2.3×10⁶ | 13.3 |
| Do | 103,500 | 4.2×10⁶ | 11.5 |
| Do | 147,000 | 6.0×10⁶ | 11.2 |
| 5% Vinyl Acetate | 0 | 0 | |
| Do | 56,000 | 2.3×10⁶ | 13.3 |
| Do | 103,500 | 4.2×10⁶ | 12.7 |
| Do | 147,000 | 6.0×10⁶ | 11.9 |

It is to be noted that it is desirable to irradiate to an optimum level in order to obtain a balance between stability of the latex and tire cord adhesion. These data show that the most favorable results are obtained at dosages in the range of 3.5 to 4.0 megaroentgens.

EXAMPLE 3

Fourteen samples were tested, using the same starting latex as in Example 1 and the two monomers. The conditions were the same as in Example 1 except the rate and total dosage of irradiation were varied.

The viscosity of each of the irradiated samples was measured with a Brookfield syncho-electric viscosimeter. The values are reported in centipoises for four different spindle speeds.

Table III gives the results. The first group of tests was on the latex alone without the monomer. The last group of tests was with a water solution of the emulsifiers in the absence of the butyl rubber or monomer.

Table III

| Latex Plus | Percent | Roentgens per hour | R×10⁻⁶ | Viscosity (Centipoise) | | | |
|---|---|---|---|---|---|---|---|
| | | | | 6 r.p.m. | 12 r.p.m. | 30 r.p.m. | 60 r.p.m. |
| No Monomer | | 0 | 0 | 500 | 303 | 158 | 99 |
| Do | | 102,000 | 2.2 | 340 | 210 | 112 | 72 |
| Do | | 144,000 | 4.5 | 460 | 285 | 162 | 109 |
| Do | | 292,000 | 6.3 | 860 | 505 | 292 | 200 |
| Acrylonitrile | 4.3 | | 0 | 470 | 285 | 150 | 98 |
| Do | 4.3 | 102,000 | 2.2 | 3,360 | 2,250 | 1,260 | 806 |
| Do | 4.3 | 144,000 | 4.5 | 3,840 | 2,600 | 1,560 | 1,090 |
| Do | 4.3 | 292,000 | 6.3 | 2,620 | 1,610 | 911 | 626 |
| Vinyl Acetate | 5.9 | 0 | 0 | 490 | 300 | 155 | 99 |
| Do | 5.9 | 102,000 | 2.2 | 280 | 175 | 97 | 63 |
| Do | 5.9 | 144,000 | 4.5 | 240 | 155 | 85 | 57 |
| Do | 5.9 | 292,000 | 6.3 | 185 | 130 | 74 | 48 |
| Emulsifiers w/o rubber or monomers | | 0 | 0 | 10 | 7.5 | 6 | 6.4 |
| Do | | 102,000 | 2.2 | 5 | 4.5 | 3 | 5.8 |
| Do | | 144,000 | 4.5 | 5 | 5 | 5 | 5 |
| Do | | 292,000 | 6.3 | 5 | 2.5 | 3 | 4.3 |

It is interesting to note that there is an increase in the viscosity of the final latex when acrylonitrile is used; and that there is a decrease when vinyl acetate is used. These data show that the viscosity of the final latex can readily be controlled by using a mixture of the two monomers in select proportions.

Having described this invention, what is sought to be protected by Letters Patent is succinctly set forth in the following claims.

What is claimed is:

1. A process for stabilizing an aqueous butyl latex which comprises admixing a butyl latex containing in the range of 20 to 60 wt. percent solids and consisting essentially of a butyl rubber and water, within the range of 3 to 10 wt. percent of a polymerizable monomer selected from the group consisting of vinyl acetate and acylonitrile, irradiating the admixture so formed within the range of 0.75 to 50 megaroentgens of high intensity ionizing radiation at a dose rate of at least 50,000 roentgens per hour and recovering a stable butyl latex.

2. The process of claim 1 wherein said butyl latex is formed from butyl rubber particles under 10 microns in size, said butyl rubber being formed from 0.5 to 15 wt. percent isoprene and the remainder iso-butylene and having a Wijs iodine number in the range of 0.5 to 50, and Staudinger molecular weight in the range of 35,000 to 2,000,000.

3. The process of claim 2 wherein said butyl rubber contains from 1 to 2 wt. percent isoprene and said butyl latex contains 1 to 10 wt. percent of added emulsifying agents selected from the group consisting of potassium oleate, polyvinyl alcohol and polyoxoethylated alkyl phenol.

4. The process of claim 1 wherein the pressure during the irradiation is sufficient to maintain substantially liquid phase conditions, and the temperature is relatively low, being below 100° F.

5. A stable butyl latex prepared by irradiating an aqueous latex emulsion consisting of water and about 26% by weight of total solids comprising emulsifiers and butyl rubber, said butyl rubber having a Staudinger molecular weight of about 440,000 and 1.5 to 1.7 mole percent unsaturation, in admixture with about 5 wt. percent of acrylonitrile, the irradiation comprising essentialy gamma rays at an intensity of about 420,000 r./hr., the dosage received being about 7.2 megaroentgens.

6. A stabilized aqueous butyl latex prepared by admixing a butyl latex containing in the range of 20 to 60 wt. percent solids and consisting essentially of a butyl rubber and water, within the range of 3 to 10 wt. percent of a polymerizable monomer selected from the group consisting of vinyl acetate and acrylonitrile, and irradiating the admixture so formed within the range of 0.75 to 50 megaroentgens of high intensity ionizing radiation at a dose rate of at least 50,000 roentgens per hour.

References Cited in the file of this patent

FOREIGN PATENTS

| 665,262 | Great Britain | Jan. 23, 1952 |
| 665,263 | Great Britain | Jan. 23, 1952 |
| 64,191 | France | May 18, 1955 |
| | (1st add. of 1,079,401) | |

OTHER REFERENCES

Ballantine et al.: "J. of Polymer Science," vol. 19, No. 91, pp. 219–224, January 1956.

Lawton et al.: "Nature," vol. 172, pp. 76, 77, July 11, 1953.

"Radiation Applications," Radiation and the Polymer Industry, March 1955, Radiation Applications Inc., 342 Madison Ave., N.Y. 17, N.Y.

Brookhaven National Laboratory Report No. 375, p. 26, April 1956.

"J. Polymer Science," vol. 19, No. 91, pp. 219–224, January 1956.